US006948449B2

(12) United States Patent
Van der Lingen et al.

(10) Patent No.: US 6,948,449 B2
(45) Date of Patent: Sep. 27, 2005

(54) MILKING APPARATUS AND HOLDER FOR RECEIVING TEAT CUPS

(75) Inventors: Daan D. Van der Lingen, Hasselt (NL); Peter W. Van der Sluis, IJsselmuiden (NL)

(73) Assignee: Idento Electronics B.V., Eris (NL)

( * ) Notice: Subject to any disclaimer, the term of this patent is extended or adjusted under 35 U.S.C. 154(b) by 0 days.

(21) Appl. No.: 10/344,920

(22) PCT Filed: Aug. 27, 2001

(86) PCT No.: PCT/NL01/00627

§ 371 (c)(1),
(2), (4) Date: Jul. 28, 2003

(87) PCT Pub. No.: WO02/15676

PCT Pub. Date: Feb. 28, 2002

(65) Prior Publication Data

US 2005/0072363 A1 Apr. 7, 2005

(30) Foreign Application Priority Data

Aug. 25, 2000 (NL) .................................... 1016023

(51) Int. Cl.[7] .................................................. A01J 5/04
(52) U.S. Cl. .................................. 119/14.13; 119/14.1
(58) Field of Search ............................ 119/14.1, 14.08, 119/14.13, 14.02

(56) References Cited

U.S. PATENT DOCUMENTS

| | | | | | |
|---|---|---|---|---|---|
| 492,449 | A * | 2/1893 | Westgarth | .................. | 119/14.1 |
| 2,747,544 | A * | 5/1956 | Thomas | .................. | 119/14.13 |
| 3,388,689 | A * | 6/1968 | Patrick | .................. | 119/14.13 |
| 3,973,520 | A * | 8/1976 | Flocchini | .................. | 119/14.08 |
| 4,333,421 | A * | 6/1982 | Schluckbier | ............. | 119/14.08 |
| 5,722,343 | A * | 3/1998 | Aurik et al. | ............. | 119/14.02 |
| 5,778,820 | A * | 7/1998 | van der Lely et al. | .... | 119/14.18 |
| 5,862,776 | A * | 1/1999 | van den Berg | ............ | 119/14.1 |
| 5,865,138 | A * | 2/1999 | van der Lely | ........... | 119/14.02 |
| 5,896,828 | A * | 4/1999 | Kronschnabel et al. | .. | 119/14.46 |
| 5,909,716 | A * | 6/1999 | van der Lely | ........... | 119/14.08 |
| 5,960,736 | A * | 10/1999 | Ludington et al. | ....... | 119/14.08 |
| 6,009,833 | A * | 1/2000 | van der Lely | ........... | 119/14.02 |
| 6,244,215 | B1 * | 6/2001 | Oosterling | ............... | 119/14.02 |
| 6,363,884 | B1 * | 4/2002 | Oosterling | ............... | 119/14.08 |
| 6,367,416 | B1 * | 4/2002 | van der Lely et al. | .... | 119/14.02 |
| 6,463,876 | B2 * | 10/2002 | van der Lely et al. | .... | 119/14.01 |
| 6,510,812 | B1 * | 1/2003 | Petterson et al. | ........ | 119/14.02 |
| 6,561,126 | B2 * | 5/2003 | Forsen et al. | ............ | 119/14.02 |
| 6,584,929 | B2 * | 7/2003 | van der Lely et al. | .... | 119/14.01 |
| 6,584,930 | B2 * | 7/2003 | Buecker | .................. | 119/14.02 |

(Continued)

FOREIGN PATENT DOCUMENTS

EP 0560438 A 9/1993

(Continued)

*Primary Examiner*—Robert P. Swiatek
(74) *Attorney, Agent, or Firm*—The Webb Law Firm

(57) ABSTRACT

An apparatus for milking livestock, which apparatus has a milking box; a milking robot disposed close to or in the milking box; and a holder for receiving therein teat cups which during use are arranged on an animal for milking by the milking robot, and a holder for such an apparatus. The holder has a guard, a carriage with an engaging mechanism for engaging the teat cups and with a displacer for displacing the carriage between a first position, in which at least the teat cups are protected by the guard in the situation engaged by the carriage, and a second position, in which the teat cups are released for removal by the milking robot.

7 Claims, 3 Drawing Sheets

U.S. PATENT DOCUMENTS

| | | | | |
|---|---|---|---|---|
| 6,619,227 | B1 * | 9/2003 | Berger et al. | 119/14.08 |
| 6,622,651 | B1 * | 9/2003 | Dessing | 119/14.08 |

FOREIGN PATENT DOCUMENTS

| | | | | |
|---|---|---|---|---|
| EP | 0647390 | A | | 4/1995 |
| EP | 0811319 | A | | 12/1997 |
| NL | 0360354 | A1 | * | 3/1990 |
| NL | 0545916 | A2 | * | 6/1993 |
| NL | 0630557 | A2 | * | 12/1994 |
| NL | 0634095 | A1 | * | 1/1995 |
| NL | 0635204 | A1 | * | 1/1995 |
| WO | WO 99 07212 | A | | 2/1999 |

* cited by examiner

MILKING APPARATUS AND HOLDER FOR RECEIVING TEAT CUPS

BACKGROUND OF THE INVENTION

1. Field of the Invention

The present invention relates to an apparatus for milking livestock, comprising a milking box; a milking robot disposed close to or in the milking box; and a holder for receiving therein teat cups which during use are arranged on an animal for milking by the milking robot, and the invention relates more particularly in such an apparatus to the holder for receiving teat cups therein.

2. Brief Description of the Related Art

Such an apparatus and holder are generally known.

A drawback of the prior art is that the holder for receiving teat cups is stationary. A freedom of movement in a wide area is therefore required of the milking robot. This makes high demands of the choice of dimensions, materials used and so on. In the known art the teat cups are moreover subject to all sorts of harmful influences, such as the excrement of the animals for milking, and the animals may kick against the teat cups if they become restless.

The invention has for its object to obviate the above stated drawbacks of the known art, for which purpose an apparatus for milking livestock and more particularly herein a holder for receiving teat cups are distinguished in that the holder comprises: a guard; a carriage with engaging means for engaging the teat cups and with displacing means for displacing the carriage between a first position, in which at least the teat cups are protected by the guard in the situation engaged by the carriage, and a second position, in which the teat cups are released for removal by the milking robot.

SUMMARY OF THE INVENTION

According to the invention the teat cups can thus be retracted into the first position in which they are protected by the guard, so that the teat cups are not exposed to the above stated and other harmful influences in a milking parlour. In the second position the chosen reach of the milking robot can further be smaller when the second position is closer to the milking robot than the first position, which is preferably the case.

In a first preferred embodiment an additional movement is provided, wherein the carriage is movable in the direction of the milking robot in the second position or at least prior to reaching the second position. This is particularly advantageous when the first and the second position are at least approximately the same distance from the milking robot, and with this feature the teat cups can be carried closer to the milking robot so as to reduce the reach required of it. Such an additional movement can be realized in simple manner in that the carriage is tiltable in or close to the second position. In such an embodiment the shape of the body of an animal for milking is of course also taken into account, wherein the teat cups are for instance first displaced downward in the carriage to the second position and are then swivelle in the direction of the milking robot. In an arrangement where the milking robot and the holder are arranged opposite one another relative to an animal for milking, the teat cups are thus tilted herein in the direction of the udder of an animal for milking.

In another preferred embodiment, conduits running from the teat cups comprise tensioning means for retracting the teat cups into the engaging means of the carriage when it is established that hardly any milk is running through the conduits. Such a situation may have different causes. The teat cup may have fallen off or been kicked off, or a relevant quarter of a cow for milking is empty. Since this will never, or in any case seldom, occur with all teat cups simultaneously, a fallen teat cup is retracted into the safe environment of the carriage, while the other teat cups can continue milking the relevant quarters of the udder of for instance a cow. Once a fallen teat cup has been retracted into the engaging means of the holder, the milking robot can be instructed to rearrange the teat cup on the teats from which it has fallen. This is a choice based on the consideration of whether milk can still be expected from the relevant quarter and so on. This embodiment is favourable in that the milking robot does not need here to search for the fallen teat cup on the parlour floor, but that the teat cup can be found with certainty in the engaging means of the displaceable carriage of the holder.

In a further favourable embodiment the holder and the apparatus have the feature that the guard comprises a cleaning unit for cleaning the teat cups in the first position of the carriage. After cleaning of the teat cups in the first position, the guard ensures that, after cleaning, the teat cups cannot be fouled again, for instance by excrement from an animal for milking, such as a cow.

BRIEF DESCRIPTION OF THE DRAWINGS

As already stated above, the present invention comprises both an apparatus for milking livestock and in particular a holder used herein for receiving teat cups. The invention will be further elucidated on the basis of the description following hereinbelow which is related to the annexed drawings, in which.

DETAILED DESCRIPTION OF THE PREFERRED EMBODIMENTS

Figure 1:
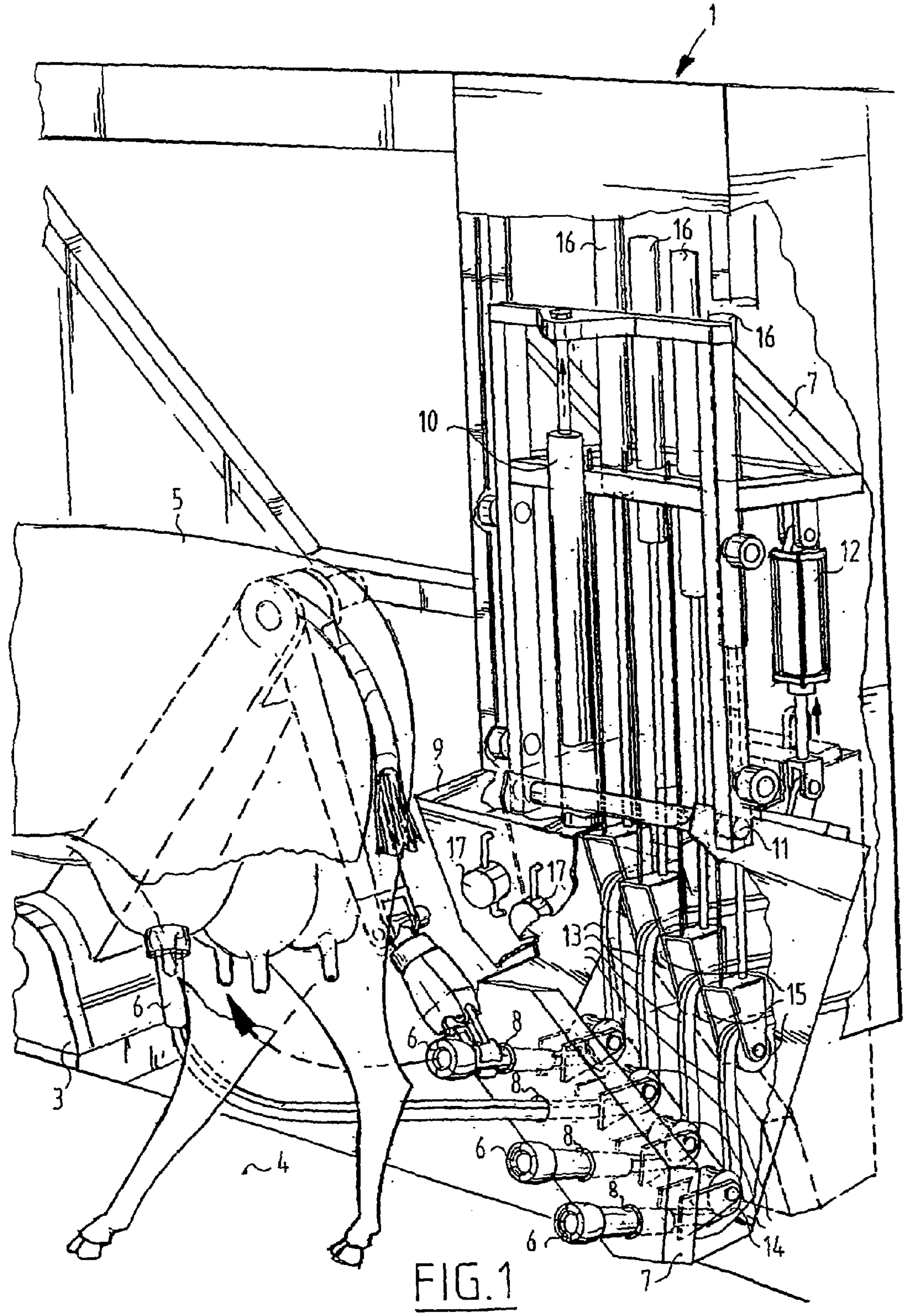
FIG. 1 shows a perspective view of an apparatus with a holder for teat cups, both according to the present invention.

FIG. 1 shows an apparatus 1 with a holder 2 for receiving teat cups therein, both according to the present invention. Apparatus 1 further comprises a milking robot 3, wherein holder 2 and milking robot 3 are both disposed in the vicinity of a milking parlour 4. A cow 5 for milking is placed in milking parlour 4, whereafter the milking robot 3 removes teat cups 6 from holder 2 in order to arrange them on the teats of the udder of a cow 5.

Figure 2:
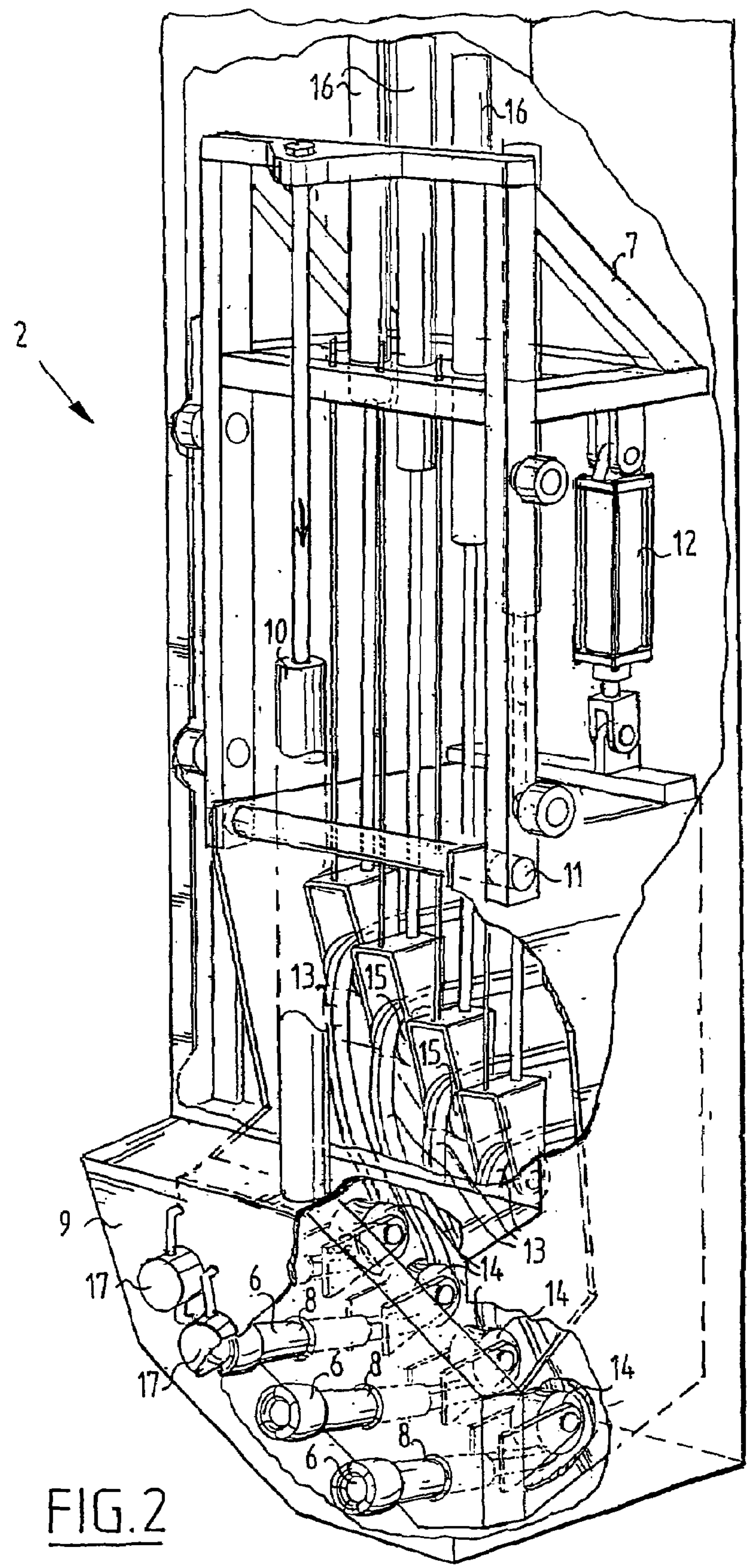
FIG. 2 shows a partly cut-away perspective view of a holder from an apparatus, both according to the present invention.
Figure 3:
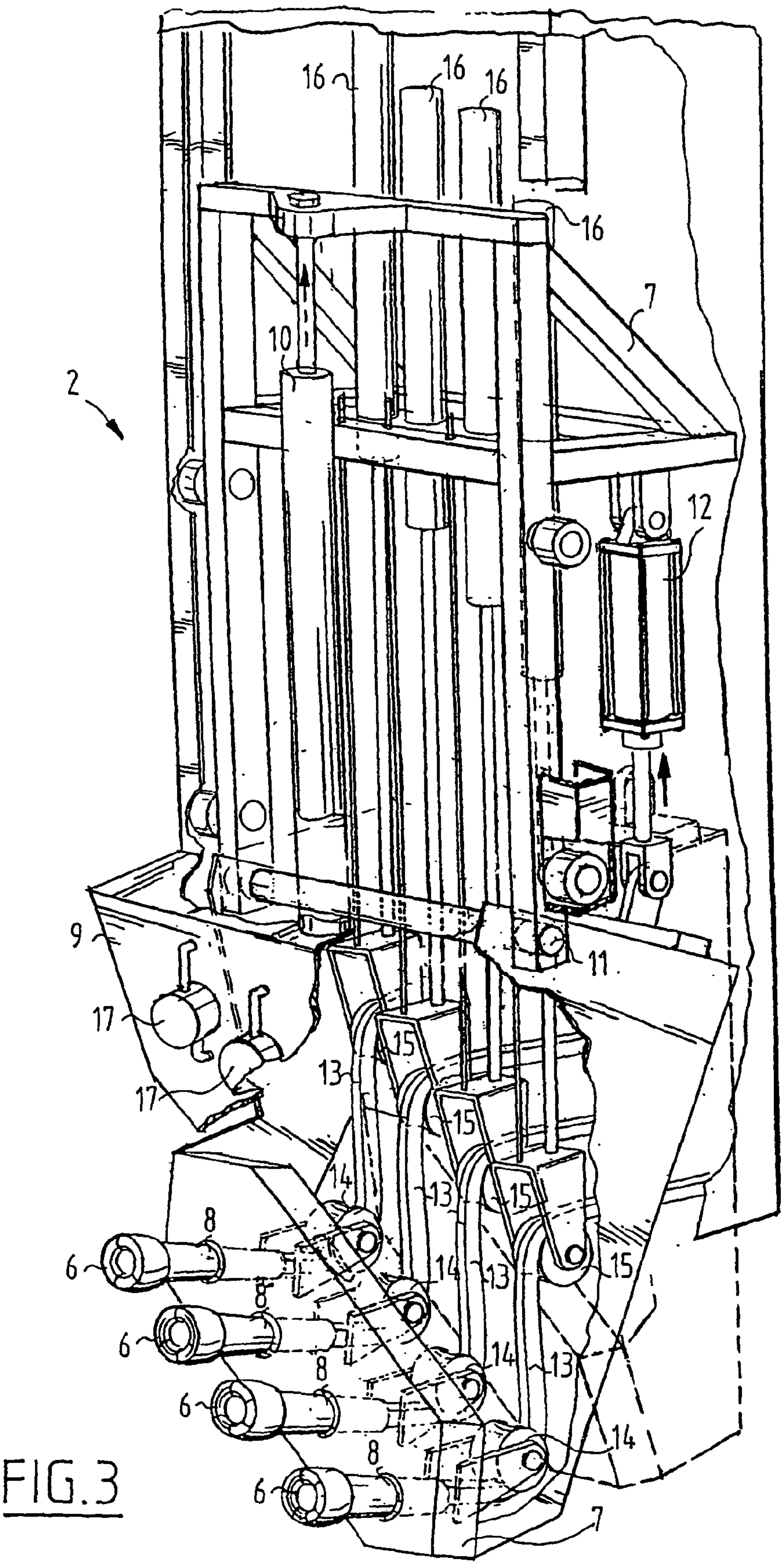
FIG. 3 shows a perspective view of the holder of FIG. 2 in a different situation.

As is also shown in FIGS. 2 and 3, holder 2 comprises a carriage 7 with engaging means designed as passages 8 for engaging teat cups 6. As shown in FIG. 1, it is possible with milking robot 3 to take teat cups 6 out of the passages 8 so as to place them on the teats of the udder of a cow 5. The location of the teat cups can thus be very readily defined, so that milking robot 3 can find them immediately.

Holder 2 further comprises a guard designed as a plate 9, wherein carriage 7 with teat cups 6 engaged by the engaging means can be retracted behind plate 9 when using displacing means designed as a cylinder 10. In the situation shown in FIG. 2 with the carriage 7 retracted behind plate 9, teat cups 6 are protected against the harmful influences in a milking parlour 4, such as kicking by the animals for milking, and excrement. In the context of the present description this situation is designated as the first position, while the second position of carriage 7, in which the teat cups 6 are released for removal by milking robot 3, is shown in FIGS. 1 and 3.

In an embodiment such as that shown in the drawings, it is advantageous when carriage 7 consists of two parts which are coupled for tilting on a pivot point 11. The upper part of carriage 7 in the figures is only movable up and downward under the influence of cylinder 10, while the lower part of carriage 7 in the figures is tiltable on pivot point 11 relative to the upper part of carriage 7 under the influence of another cylinder 12. The teat cups are thus carried closer to the udder of a cow 5 for milking, and also closer to the milking robot on the opposite side of milking box 4, so that the reach required of milking robot 3 can be reduced, and the length of the hoses 13 connected to teat cups 6 can be kept to a minimum.

Hoses 13 are each trained round two wheels 14, 15. One of these wheels 14 is stationary in carriage 7, while the other wheel 15 is suspended from a cylinder 16. By driving cylinders 16 to make them shorter, i.e. to retract the pistons into the cylinder housings, a length of the hoses 13 can each be taken up separately.

Preferably connected to hoses 13 are flow sensors which detect whether a milk flow is still running through the relevant conduit 13. If this is not the case for one of the conduits 13, it can be concluded that an associated teat cup 6 has fallen off or been kicked off, or that the associated quarter from which this teat cup 6 is suspended is empty. The relevant teat cup 6 can in any case be retracted into the passage 8 in carriage 7 so as to prevent damage or fouling of teat cup 6, since it would otherwise remain lying on the floor of milking parlour 4. For this purpose the relevant cylinder 16 is therefore set into operation to shorten the hose 13 associated with the teat cup 6 which has fallen off or finished milking in order to retract this teat cup 6. The cylinders 16 together with wheels 14, 15 and the manner in which hoses 13 are trained round these wheels 14, 15 thus form tensioning means for retracting teat cups 6.

It is noted that the flow sensors are not shown, but that each of the hoses 13, or in any case those of the hoses 13 intended for discharge of milked milk, are provided with such a flow sensor. It is thus possible to retract each of the teat cups 6 individually to carriage 7 using the tensioning means.

It is further the case that the plate 9 forming a guard is also provided with a cleaning unit formed by caps 17, to which for instance water and air conduits run for the purpose of spraying clean respectively blowing dry the teat cups 6 in the first position of carriage 7 when it is retracted behind plate 9 and where both teat cups are located in the vicinity of caps 17. Alternatively, caps 17 can form a collector for cleaning liquid which is pushed from the other side through hoses 13, and therefore through teat cups 6, in order to clean teat cups 6. The outer end of teat cups 6 for attaching to the teats of an udder of a cow then forms an exit for this cleaning liquid, which is collected by caps 17.

It is noted once again that the first position of carriage 7, retracted behind the guard designed as plate 9, is shown in FIG. 2, while the second position of carriage 7, in which the teat cups are released for removal by the milking robot, is shown in FIG. 3. FIG. 2 shows clearly that the outer ends of teat cups 6 are directed toward caps 17 so as to form, in combination, cleaning means.

Within the scope of the present invention as defined in the appended claims, many additional and alternative embodiments are possible, which must all be deemed as lying within the scope of protection of the present invention. It is thus possible for the tensioning means to be designed in any random manner other than with the cylinders 16 explicitly shown and described in the figures, for instance using a number of drums corresponding with the number of hoses 13, wherein each of the hoses is trained round one of the drums. The drums can be driven in a rotating movement, wherein the relevant associated hose 13 can be rolled up round the drum in order to thus retract the associated teat cup on the other outer end thereof.

Carriage 7 can also be designed in many alternative ways. Instead of the two-part configuration explicitly shown and described with reference to the figures, use can thus be made of a curved construction which can carry the teat cups into closer proximity to the teats of an udder of a cow for milking and to the milking robot with a single movement along the curve of the construction. In the explicitly shown and described construction the tilting movement with cylinder 12 on pivot point 11 can already begin as soon as the lower, tiltable part of carriage 7 is clear of the guard designed as plate 9. It is not therefore necessary to wait until carriage 7 as a whole has reached the fully downward moved position, which can result in time being gained. It is further possible for teat cups 6 to be pressed against caps 17 in the first position of the carriage by also causing in this first position of carriage 7 a tilting movement of the lower part of carriage 7 on pivot point 11 using cylinder 12. This has the advantage that during cleaning, and also thereafter, the teat cup 6, and in any case the interior of these teat cups, is protected with even greater certainty against adverse, possibly hygienically harmful influences from outside. Although the cylinder 10 for vertical movement of carriage 7 between the first position and the second position is shown on the front side of holder 2 in the figures, it can alternatively also be mounted upside down on the top of the carriage, or behind carriage 7. Further alternative and additional embodiments of the holder in particular and more generally the apparatus according to the present invention will also occur to the skilled person after examination of the foregoing.

What is claimed is:

1. An apparatus for milking livestock, comprising a milking box; a milking robot disposed close to or in the milking box; and a holder for receiving therein teat cups which during use are arranged on an animal for milking by the milking robot, wherein the holder comprises:

a guard; a carriage with engaging means for engaging the teat cups and with displacing means for displacing the carriage between a first position, in which at least the teat cups are protected by the guard in the situation engaged by the carriage, and a second position, in which the teat cups are released for removal by the milking robot.

2. The apparatus as claimed in claim 1, wherein the carriage is movable in the direction of the milking robot in the second position or at least prior to reaching the second position.

3. The apparatus as claimed in claim 2, wherein the carriage is tiltable in or close to the second position.

4. The apparatus as claimed in claim 1, wherein a flow sensor measuring the milk flow through a conduit is arranged connected to conduits running from the teat cups.

5. The apparatus as claimed in claim 4, wherein the conduits comprise tensioning means for retracting the teat cups into the engaging means of the carriage if it is established that at least hardly any milk is running through the conduit.

6. The apparatus as claimed in claim 1, wherein the guard comprises a cleaning unit for cleaning the teat cups in the first position of the carriage.

7. A holder for receiving teat cups therein and for use in an apparatus for milking livestock, comprising a milking box; a milking robot disposed close to or in the milking box; and a holder for receiving therein teat cups which during use are arranged on an animal for milking by the milking robot, wherein the holder comprises: a guard; a carriage with engaging means for engaging the teat cups and with displacing means for displacing the carriage between a first position, in which at least the teat cups are protected by the guard in the situation engaged by the carriage, and a second position, in which the teat cups are released for removal by the milking robot.

* * * * *

UNITED STATES PATENT AND TRADEMARK OFFICE
CERTIFICATE OF CORRECTION

PATENT NO. : 6,948,449 B2
APPLICATION NO. : 10/344920
DATED : September 27, 2005
INVENTOR(S) : Van der Lingen et al.

It is certified that error appears in the above-identified patent and that said Letters Patent is hereby corrected as shown below:

Column 4, Line 47, Claim 1, “guard;” should read -- guard in the form of a plate; --

Column 4, Line 50/51, Claim 1, “situation engaged” should read
-- situation wherein the teat cups are engaged --

Column 5, Line 9, Claim 7, “guard;” should read -- guard in the form of a plate; --

Column 6, Line 4, Claim 7, “situation engaged” should read
-- situation wherein the teat cups are engaged --

Signed and Sealed this

Fifth Day of September, 2006

JON W. DUDAS

*Director of the United States Patent and Trademark Office*

UNITED STATES PATENT AND TRADEMARK OFFICE

CERTIFICATE OF CORRECTION

PATENT NO. : 6.948,449 B2
APPLICATION NO. : 10/344920
DATED : September 27, 2005
INVENTOR(S) : Van der Lingen et al.

It is certified that error appears in the above-identified patent and that said Letters Patent is hereby corrected as shown below:

Title Page, See Item (73) Assignee: “Idento Electronics B. V., Eris (NL)” should read -- Idento Electronics B.V., Ens (NL) --

Signed and Sealed this

Seventh Day of November, 2006

JON W. DUDAS
*Director of the United States Patent and Trademark Office*